United States Patent
Ito et al.

(10) Patent No.: US 10,385,228 B2
(45) Date of Patent: Aug. 20, 2019

(54) INK SET AND RECORDING METHOD

(71) Applicant: Brother Kogyo Kabushiki Kaisha, Nagoya-shi, Aichi-ken (JP)

(72) Inventors: Shinpei Ito, Nagoya (JP); Yasuhiro Taga, Kani (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/882,483

(22) Filed: Jan. 29, 2018

(65) Prior Publication Data

US 2018/0282565 A1 Oct. 4, 2018

(30) Foreign Application Priority Data

Mar. 31, 2017 (JP) ................................. 2017-071133

(51) Int. Cl.
| | |
|---|---|
| *C09D 11/40* | (2014.01) |
| *B41J 2/21* | (2006.01) |
| *B41J 2/50* | (2006.01) |
| *C09D 11/52* | (2014.01) |
| *C09D 11/38* | (2014.01) |
| *C09D 11/328* | (2014.01) |

(Continued)

(52) U.S. Cl.
CPC ................. *C09D 11/40* (2013.01); *B41J 2/01* (2013.01); *B41J 3/4078* (2013.01); *B41M 5/0017* (2013.01); *B41M 5/0047* (2013.01); *C09D 11/037* (2013.01); *C09D 11/328* (2013.01); *C09D 11/38* (2013.01); *D06P 5/00* (2013.01); *B41M 5/0064* (2013.01)

(58) Field of Classification Search
CPC ........ B41J 2/2107; B41J 2/211; B41J 2/5052; B41J 3/4078; C09D 11/52; C09D 11/40; C09D 11/38; C09D 11/328
See application file for complete search history.

(56) References Cited

U.S. PATENT DOCUMENTS

| | | |
|---|---|---|
| 8,016,404 B2 | 9/2011 | Kato et al. |
| 8,690,304 B2 | 4/2014 | Sugimoto et al. |

(Continued)

FOREIGN PATENT DOCUMENTS

| | | |
|---|---|---|
| JP | S63-299971 A | 12/1988 |
| JP | 2003-127351 A | 5/2003 |

(Continued)

*Primary Examiner* — Jason S Uhlenhake
(74) *Attorney, Agent, or Firm* — Banner & Witcoff, Ltd.

(57) ABSTRACT

An ink set of the present teaching includes a water-based ink for ink-jet recording and a fixing agent. The water-based ink for ink-jet recording contains water and at least one of a direct dye and an acid dye, and the fixing agent contains a cationic compound represented by Formula (1):

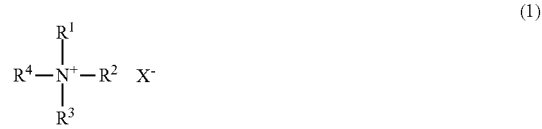

wherein in Formula (1):
$R^1$ to $R^4$ are hydrocarbon groups each having 1 to 20 carbon atoms, and are identical with each other or different from each other; and
$X^-$ is an anion.

20 Claims, 3 Drawing Sheets

(51) Int. Cl.
*B41J 2/01* (2006.01)
*B41M 5/00* (2006.01)
*B41J 3/407* (2006.01)
*C09D 11/037* (2014.01)
*D06P 5/00* (2006.01)

(56) References Cited

U.S. PATENT DOCUMENTS

2008/0241398 A1 10/2008 Kato et al.
2012/0081459 A1* 4/2012 Sugimoto .............. B41J 2/2114
　　　　　　　　　　　　　　　　　　　　　347/21

FOREIGN PATENT DOCUMENTS

JP　　2008-246821 A　　10/2008
JP　　2012-091491 A　　5/2012

* cited by examiner

INK SET AND RECORDING METHOD

CROSS REFERENCE TO RELATED APPLICATION

The present application claims priority from Japanese Patent Application No. 2017-071133, filed on Mar. 31, 2017, the disclosure of which is incorporated herein by reference in its entirety.

BACKGROUND OF THE INVENTION

Field of the Invention

The present invention relates to an ink set and a recording method.

Description of the Related Art

An ink-jet recording method has been suggested, in which the printing is performed by using a water-based ink containing a dye (hereinafter referred to as "water-based dye ink" in some cases) on the regular paper such as sheets of copy paper and report pad (Japanese Patent Application Laid-open No. 2003-127351).

However, a new ink-jet recording method based on the use of a water-based dye ink is demanded, which also makes it possible to perform the recording on a recording medium such as cloth (fabric) or the like other than the recording paper such as the regular paper or the like, in addition to the recording on the recording paper. In this case, if the water-based dye ink, which is directed to the recording paper, is merely diverted to the recording on the cloth, the color is lost when the cloth is washed with water. Further, it is also demeaned that the color change (color difference) is small between when the recording is performed on the recording paper and when the recording is performed on the cloth.

In view of the above, an object of the present teaching is to provide an ink set including a water-based ink for ink-jet recording which can be utilized for the recording on both of the recording paper and any recording medium other than the recording paper, and a fixing agent.

SUMMARY OF THE INVENTION

According to a first aspect of the present teaching, there is provided an ink set including a water-based ink for ink-jet recording containing water and at least one of a direct dye and an acid dye; and a fixing agent containing a cationic compound represented by Formula (1):

wherein in Formula (1):
R$^1$ to R$^4$ are hydrocarbon groups each having 1 to 20 carbon atoms, and are identical with each other or different from each other; and
X$^-$ is an anion.

According to a second aspect of the present teaching, there is provided a recording method for performing recording on a recording medium by using an ink set including a water-based ink for ink-jet recording and a fixing agent, the recording method including:
applying the fixing agent to the recording medium when the recording medium is any recording medium other than recording paper; and
discharging the water-based ink onto the recording medium by an ink-jet system, wherein:
the water-based ink contains a dye and water; and
the fixing agent contains a cationic compound represented by Formula (1):

wherein in Formula (1):
R$^1$ to R$^4$ are hydrocarbon groups each having 1 to 20 carbon atoms, and are identical with each other or different from each other; and
X$^-$ is an anion.

DESCRIPTION OF THE PREFERRED EMBODIMENTS

[Ink Set]

The ink set of the present teaching will be explained. The ink set of the present teaching includes a water-based ink for ink-jet recording (hereinafter referred to as "water-based ink" or "ink" in some cases), and a fixing agent. The ink set of the present teaching includes the water-based dye ink containing at least one of a direct dye and an acid dye, and the fixing agent containing a cationic compound represented by Formula (1), and thus the ink set of the present teaching can be utilized for the recording on both of the recording paper and any recording medium other than the recording paper.

<Water-Based Ink>

At first, the water-based ink will be explained. The water-based ink contains at least one of the direct dye and the acid dye and water.

The dye skeletons of the direct dye and the acid dye are not specifically limited. However, it is possible to exemplify, for example, dye skeletons and metal complexes thereof based on monomethine, dimethine, trimethine, cyanine, merocyanine, dicyanostyryl, diphenylmethane, triphenylmethane, xanthene, squarylium, quinophthalone, monoazo, bisazo, disazo, trisazo, quinophthalone, anthraquinone, anthrapyridone, perylene, diketopyrrolopyrrole, isoindolinone, phthalocyanine, azomethine, dioxazine, and dipyrromethene.

When the water-based ink is used, for example, as a water-based yellow ink, at least one of the direct dye and the acid dye may contain, for example, a disazo-based dye. Further, when the water-based ink is used, for example, as a water-based magenta ink, at least one of the direct dye and the acid dye may contain, for example, an anthrapyridone-based dye. Then, when the water-based ink is used, for example, as a water-based cyan ink, at least one of the direct dye and the acid dye may contain, for example, a phthalocyanine-based dye.

The direct dye is not specifically limited, which is exemplified, for example, by C. I. Direct Black, C. I. Direct Blue, C. I. Direct Red, C. I. Direct Yellow, C. I. Direct Orange, C. I. Direct Violet, C. I. Direct Brown, and C. I. Direct Green. C. I. Direct Black described above is exemplified, for example, by C. I. Direct Blacks 17, 19, 32, 51, 71, 108, 146, 154, and 168. C. I. Direct Blue described above is exemplified, for example, by C. I. Direct Blues 6, 22, 25, 71, 86, 90, 106, and 199. C. I. Direct Red described above is exemplified, for example, by C. I. Direct Reds 1, 4, 17, 28, 83, and 227. C. I. Direct Yellow described above is exemplified, for example, by C. I. Direct Yellows 12, 24, 26, 86, 98, 132, 142, and 173. C. I. Direct Orange described above is exemplified, for example, by C. I. Direct Oranges 34, 39, 44, 46, and 60. C. I. Direct Violet described above is exemplified, for example, by C. I. Direct Violets 47 and 48. C. I. Direct Brown described above is exemplified, for example, by C. I. Direct Brown 109. C. I. Direct Green described above is exemplified, for example, by C. I. Direct Green 59.

The acid dye is not specifically limited as well, which is exemplified, for example, by C. I. Acid Black, C. I. Acid Blue, C. I. Acid Red, C. I. Acid Yellow, C. I. Acid Orange, and C. I. Acid Violet. C. I. Acid Black described above is exemplified, for example, by C. I. Acid Blacks 2, 7, 24, 26, 31, 52, 63, 112, and 118. C. I. Acid Blue described above is exemplified, for example, by C. I. Acid Blues 9, 22, 40, 59, 90, 93, 102, 104, 117, 120, 167, 229, and 234. C. I. Acid Red described above is exemplified, for example, by C. I. Acid Reds 1, 6, 32, 37, 51, 52, 80, 85, 87, 92, 94, 115, 180, 256, 289, 315, and 317. C. I. Acid Yellow described above is exemplified, for example, by C. I. Acid Yellows 11, 17, 23, 25, 29, 42, 61, and 71. C. I. Acid Orange described above is exemplified, for example, by C. I. Acid Oranges 7 and 19. C. I. Acid Violet described above is exemplified, for example, by C. I. Acid Violet 49.

The blending amount of at least one of the direct dye and the acid dye in relation to the total amount of the water-based ink is not specifically limited, which is, for example, 0.1% by weight to 20% by weight, 1% by weight to 15% by weight, and 2% by weight to 10% by weight. As for at least one of the direct dye and the acid dye described above, one type may be used singly, or two or more types may be used in combination.

The water may be ion-exchanged water or pure water (purified water). The blending amount of the water in relation to the total amount of the water-based ink may be, for example, the balance of the other components.

The water-based ink may further contain a water-soluble organic solvent. The water-soluble organic solvent is exemplified, for example, by a humectant that prevents the water-based ink from drying at an end of a nozzle in an ink-jet head and a penetrant that adjusts the drying velocity on a recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. It is allowable that only one kind of the humectant as described above is used singly, or two or more kinds of the humectants are used in combination. Among the above-described humectants, the humectant may preferably be a polyvalent alcohol such as alkylene glycol and glycerol.

The blending amount of the humectant in relation to the total amount of the water-based ink is, for example, in a range of 0% by weight to 95% by weight, in a range of 5% by weight to 80% by weight, or in a range of 5% by weight to 50% by weight.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One type of the penetrant may be used singly, or two or more of the penetrants may be used in combination.

The blending amount of the penetrant in relation to the total amount of the water-based ink is, for example, in a range of 0% by weight to 20% by weight, in a range of 0% by weight to 15% by weight, or in a range of 1% by weight to 6% by weight.

The water-based ink may further contain a conventionally known additive, as necessary. The additive is exemplified, for example, by surfactant, pH-adjusting agents, viscosity-adjusting agents, surface tension-adjusting agents, and fungicides. The viscosity-adjusting agents are exemplified, for example, by polyvinyl alcohol and cellulose.

The water-based ink can be prepared, for example, such that at least one of the direct dye and the acid dye, water, and optionally other additive components are mixed uniformly or homogeneously by any known conventional method, and undissolved matters are removed by using a filter or the like.

<Fixing Agent>

Next, the fixing agent will be explained. The fixing agent contains the cationic compound represented by Formula (1). The fixing agent is characterized in that the fixing agent contains the cationic compound represented by Formula (1), and other features thereof are not restricted at all.

In Formula (1), each of $R^1$ to $R^4$ represents a hydrocarbon group having 1 to 20 carbon atoms, which is exemplified, for example, by an aryl group in addition to an alkyl group as described later on. In Formula (1), $R^1$ to $R^4$ may be identical with each other or different from each other.

In Formula (1), each of $R^1$ to $R^3$ may be an alkyl group having 1 to 5 carbon atoms. The alkyl group having 1 to 5 carbon atoms may have either a straight chain or a branched chain, which is exemplified by methyl group, ethyl group, n-propyl group, isopropyl group, n-butyl group, sec-butyl group, isobutyl group, tert-butyl group, n-pentyl group, isopentyl group, sec-pentyl group, 3-pentyl group, and tert-pentyl group. The alkyl group having 1 to 5 carbon atoms may have a substituent group such as a halogen atom or the like. In Formula (1), $R^1$ to $R^3$ may be identical with each other or different from each other.

In Formula (1), $R^4$ may be an alkyl group having 6 to 30 carbon atoms. Further, $R^4$ may be an alkyl group having 6 to 20 carbon atoms. The alkyl group having 6 to 30 carbon atoms is exemplified, for example, by hexyl group, heptyl group, octyl group, nonyl group, decyl group, lauryl group (dodecyl group), tetradecyl group, and cetyl group (hexadecyl group). The alkyl group having 6 to 30 carbon atoms may have a substituent group such as a halogen atom or the like, and the alkyl group having 6 to 30 carbon atoms may have either a straight chain or a branched chain.

In Formula (1), each of $R^1$ to $R^3$ may be a methyl group, and $R^4$ may be an alkyl group having 12 to 16 carbon atoms. The alkyl group having 12 to 16 carbon atoms is exemplified, for example, by lauryl group and cetyl group.

Further, in Formula (1), each of $R^1$ and $R^2$ may be a methyl group, and each of $R^3$ and $R^4$ may be a hydrocarbon group having 7 to 20 carbon atoms.

In Formula (1), $X^-$ is an anion. The anion may be any anion. However, the anion is exemplified, for example, by methylsulfate ion, ethylsulfate ion, sulfate ion, nitrate ion, acetate ion, dicarboxylic acid (for example, malic acid and itaconic acid) ion, tricarboxylic acid (for example, citric acid) ion, hydroxide ion, and halide ion. When $X^-$ is dicarboxylic acid ion or tricarboxylic acid ion, dicarboxylic acid ion or tricarboxylic acid ion is the counter ion of two or three quaternary ammonium ions (cation obtained by excluding $X^-$ from Formula (1)). As for the anion, it is preferable to use sulfate ion and halide ion such as chlorine ion or the like. As for the cationic compound represented by Formula (1), it is also allowable to use only compounds in which $X^-$ (anion) is identical, or it is also allowable to use, in combination, two or more types of compounds in each of which $X^-$ (anion) is different.

The cationic compound represented by Formula (1) is exemplified, for example, by lauryltrimethylammonium sulfate, lauryltrimethylammonium chloride, cetyltrimethylammonium chloride, didecyldimethylammonium chloride, and benzyldimethylalkylammonium chloride. The cationic compound represented by Formula (1) may be privately prepared. Alternatively, it is also allowable to use any commercially available product. The commercially available product is exemplified, for example, by "Catiogen (trade name) TML", "Catiogen (trade name) TMP", and "Catiogen (trade name) ES-O" produced by Dai-ichi Kogyo Seiyaku Co., Ltd. and "benzalkonium chloride" produced by Tokyo Kasei Kogyo Co., Ltd. As for the cationic compound represented by Formula (1), one type may be used singly, or two or more types may be used in combination.

The blending amount of the cationic compound in relation to the total amount of the fixing agent is, for example, 0.5% by weight to 40% by weight, 0.5% by weight to 20% by weight, 0.9% by weight to 10% by weight, and 1% by weight to 10% by weight.

The fixing agent may further contain water. It is preferable that water is ion exchange water or pure water. The blending amount of water in relation to the total amount of the fixing agent is, for example, not less than 30% by weight, not less than 50% by weight, and not less than 80% by weight. The upper limit value of the blending amount of water in relation to the total amount of the fixing agent is, for example, not more than 98% by weight, not more than 95% by weight, and not more than 90% by weight.

The fixing agent may further contain a moistening agent (humectant). As for the humectant, for example, it is possible to use the humectants which are the same as or equivalent to those exemplified in relation to the water-based ink described above. It is preferable to use polyhydric alcohol, and it is especially preferable to use propylene glycol. The blending amount of the humectant in relation to the total amount of the fixing agent is, for example, 0% by weight to 80% by weight, 1% by weight to 60% by weight, and 1% by weight to 50% by weight.

The fixing agent may further contain a permeating agent (penetrant). As for the penetrant, for example, glycol ether, which is the same as or equivalent to that exemplified in relation to the water-based ink described above, is exemplified. Triethylene glycol n-butyl ether is especially preferred. The blending amount of the penetrant in relation to the total amount of the fixing agent is, for example, 0% by weight to 20% by weight, 0.2% by weight to 10% by weight, and 0.4% by weight to 10% by weight. It is estimated that if the blending amount of the penetrant in relation to the total amount of the fixing agent is 0.4% by weight to 10% by weight, for example, when the recording medium is cloth, then the fixing agent penetrates or permeates into the cloth more uniformly or homogeneously, the function as the fixing agent is exhibited more easily, and it is possible to further suppress the color from being lost on account of the washing of the cloth with water. Further, it is estimated that if the blending amount of the penetrant in relation to the total amount of the fixing agent exceeds 10% by weight, for example, when the recording medium is cloth, then the fixing agent penetrates or permeates into deep portions of the cloth, the function as the fixing agent is hardly exhibited, and hence the color is easily lost by the washing of the cloth with water. However, these mechanisms are merely estimated, and the present teaching is not limited thereto.

The fixing agent may further contain a surfactant. The surfactant is exemplified, for example, by nonionic surfactants and cationic surfactants. The surfactant may be an acetylene glycol-based nonionic surfactant represented by Formula (2). In Formula (2), m and n may be identical with each other or different from each other. m and n may be numbers which fulfill m+n=1 to 15. m and n may be numbers which fulfill, for example, m+n=3 to 11. Each of $R^{11}$ to $R^{14}$ is an alkyl group having 1 to 5 carbon atoms. The alkyl group having 1 to 5 carbon atoms may have a straight chain or a branched chain. There are exemplified methyl group, ethyl group, n-propyl group, isopropyl group, n-butyl group, sec-butyl group, isobutyl group, tert-butyl group, n-pentyl group, isopentyl group, sec-pentyl group, 3-pentyl group, and tert-pentyl group. In Formula (2), $R^{11}$ to $R^{14}$ may be identical with each other or different from each other.

(2)

For example, any commercially available product may be used as the acetylene glycol-based nonionic surfactant represented by Formula (2). The commercially available product is exemplified, for example, by "Olfine (trade name) E1004", "Olfine (trade name) E1010", "Surfynol (trade name) 440", and "Surfynol (trade name) 465" produced by Nissin Chemical Industry Co., Ltd. and "Acetylenol (trade name) E40" and "Acetylenol (trade name) E100" produced by Kawaken Fine Chemicals Co., Ltd.

The blending amount of the surfactant in relation to the total amount of the fixing agent is, for example, 0% by weight to 20% by weight, 0.1% by weight to 10% by weight, 0.1% by weight to 3% by weight, and 0.2% by weight to 2% by weight. It is estimated that if the blending amount of the surfactant in relation to the total amount of the fixing agent is 0.2% by weight to 2% by weight, for example, when the recording medium is cloth, then the fixing agent permeates into the cloth more uniformly or homogeneously, the function as the fixing agent is exhibited more easily, and it is possible to further suppress the color from being lost on account of the washing of the cloth with water. Further, it is estimated that if the blending amount of the surfactant in relation to the total amount of the fixing agent exceeds 2% by weight, for example, when the recording medium is cloth, then the fixing agent permeates into deep portions of the cloth, the function as the fixing agent is hardly exhibited, and hence the color is easily lost by the washing of the cloth with water. However, these mechanisms are merely estimated, and the present teaching is not limited thereto.

It is preferable that the fixing agent does not substantially contain any colorant such as dyes, pigments and the like so that no influence is exerted on the coloration or colorfulness of the recorded matter obtained by the recording by using the ink set. The blending amount of the colorant in relation to the total amount of the fixing agent is, for example, 0% by weight to 1% by weight and 0% by weight to 0.1% by weight.

The fixing agent may further contain any conventionally known additive, if necessary. As for the additive, for example, it is possible to use additives which are the same as or equivalent to those exemplified in relation to the water-based ink described above.

The fixing agent can be prepared, for example, such that the cationic compound described above and optionally other additive components are mixed uniformly or homogeneously by any known conventional method. The fixing agent may be, for example, in a form of liquid (fixing solution) or in a form of gel. In the case of the form of liquid (fixing solution) or the form of gel, it is easy to apply the fixing agent to the recording medium.

In the ink set of the present teaching, the ratio (C/D) of the blending amount (C: % by weight) of the cationic compound in relation to the total amount of the fixing agent with respect to the blending amount (D: % by weight) of at least one of the direct dye and the acid dye in relation to the total amount of the water-based ink is, for example, 0.05 to 10, preferably 0.1 to 5 and more preferably 0.2 to 2.5. If the ratio is within this range, the color can be more suppressed from being lost by the washing of the cloth with water when the recording medium is the cloth. Further, it is possible to more decrease the color change (color difference) between when the recording is performed on the recording paper and when the recording is performed on the cloth. It is estimated that the foregoing situation is caused by the fact that the direct dye and/or the acid dye interact/interacts the cationic compound more efficiently.

As for the ink set of the present teaching, it is preferable that both of the water-based ink and the fixing agent contain the same penetrant. When the same penetrant is contained, then the color can be more suppressed from being lost by the washing of the cloth with water when the recording medium is the cloth, and it is possible to more decrease the color change (color difference) between when the recording is performed on the recording paper and when the recording is performed on the cloth. It is estimated that this situation is caused by the fact that the conformability is improved between the water-based ink and the fixing agent which are brought in contact with each other on the recording medium. The penetrant is not specifically limited. For example, it is possible to use the penetrants mentioned above. Among them, it is preferable to use triethylene glycol n-butyl ether. Further, in view of the fact that the foregoing effect is facilitated, as for the ink set of the present teaching, the ratio (Y/X) of the blending amount (Y: % by weight) of the penetrant in relation to the total amount of the fixing agent with respect to the blending amount (X: % by weight) of the penetrant in relation to the total amount of the water-based ink is, for example, 0.05 to 5 and preferably 0.2 to 1.

As for the ink set of the present teaching, it is preferable that both of the water-based ink and the fixing agent contain the same surfactant. When the same surfactant is contained, then the color can be more suppressed from being lost by the washing of the cloth with water when the recording medium is the cloth, and it is possible to more decrease the color change (color difference) between when the recording is performed on the recording paper and when the recording is performed on the cloth. It is estimated that this situation is caused by the fact that the conformability is improved between the water-based ink and the fixing agent which are brought in contact with each other on the recording medium. The surfactant is not specifically limited. For example, it is possible to use the surfactants mentioned above. Among them, it is preferable to use the acetylene glycol-based nonionic surfactant represented by Formula (2). Further, in view of the fact that the foregoing effect is facilitated, as for the ink set of the present teaching, the ratio (y/x) of the blending amount (y: % by weight) of the surfactant in relation to the total amount of the fixing agent with respect to the blending amount (x: % by weight) of the surfactant in relation to the total amount of the water-based ink is, for example, 0.2 to 30, preferably 0.5 to 20 and more preferably 0.5 to 15.

However, the mechanisms explained above are merely estimated, and the present teaching is not limited thereto.

[Recording Method]

Next, the recording method of the present teaching will be explained.

The recording method of the present teaching resides in a recording method for performing recording by using an ink set including a water-based ink for ink-jet recording and a fixing agent; the recording method including a fixing agent applying step of selecting whether or not the fixing agent is applied depending on a type of a recording medium and applying the fixing agent to the recording medium if application is selected; and a recording step of discharging the water-based ink onto the recording medium by an ink-jet system to perform the recording. The water-based ink contains a dye and water, and the fixing agent contains a cationic compound represented by Formula (1). The application of the fixing agent is selected if the recording medium is any recording medium other than recording paper in the fixing agent applying step. The recording includes, for example, letter printing, image printing, and print or printing.

In the recording method of the present teaching, the recording medium other than the recording paper is exemplified, for example, by cloth (fabric). The cloth includes both of knitted item and textile. The material of the cloth may be either natural fiber or synthetic fiber. The natural fiber is exemplified, for example, by cotton and silk. The synthetic fiber is exemplified, for example, by polyester, nylon, and acrylic.

The ink set, which is usable in the recording method of the present teaching, is the same as or equivalent to the ink set of the present teaching described above except that the dye, which is contained in the water-based ink, is not limited to the direct dye and the acid dye, and the explanation thereof can be quoted. The dye other than the direct dye and the acid dye is not specifically limited, which is exemplified, for example, by reactive dyes. Specified examples of the dye other than the direct dye and the acid dye are exemplified, for example, by C. I. Food Black. C. I. Food Black described above is exemplified, for example, by C. I. Food Blacks 1 and 2.

In the recording method of the present teaching, the type of the dye is not specifically limited. However, it is preferable that the dye is at least one of the direct dye and the acid dye. When the direct dye and/or the acid dye is/are used, it is possible to perform the satisfactory printing when the recording medium is the recording paper. Further, the direct dye and the acid dye have relatively large amounts of anionic groups. Therefore, it is estimated that the direct dye and the acid dye interact more strongly with the cationic compound contained in the fixing agent. On this account, the color can be more suppressed from being lost by the washing of the cloth with water when the recording medium is the cloth, and it is possible to more decrease the color change (color difference) between when the recording is performed on the recording paper and when the recording is performed on the cloth. As described above, when at least one of the direct dye and the acid dye is used as the dye, it is possible to perform the more satisfactory recording on both of the recording paper and the recording medium other than the recording paper.

The recording method of the present teaching can be carried out by using, for example, an ink-jet recording apparatus of the present teaching explained below.

The ink-jet recording apparatus of the present teaching resides in an ink-jet recording apparatus including an ink set accommodating unit, a fixing agent applying mechanism, and an ink discharge mechanism, wherein the ink set usable in the recording method of the present teaching is accommodated in the ink set accommodating unit, the fixing agent for constructing the ink set can be applied to the recording medium by the fixing agent applying mechanism, and the water-based ink, which constitutes the ink set, is discharged onto the recording medium by the ink discharge mechanism. The fixing agent may not be accommodated in the ink set accommodating unit, and the fixing agent applying mechanism may be an independent mechanism separate from the ink-jet recording apparatus, rather than being mounted in the ink-jet recording apparatus. In a case that the fixing agent is not accommodated in the ink set accommodating unit, the fixing agent can be applied to the recording medium by the fixing agent applying mechanism which is the independent mechanism separate from the ink-jet recording apparatus.

Figure 1:
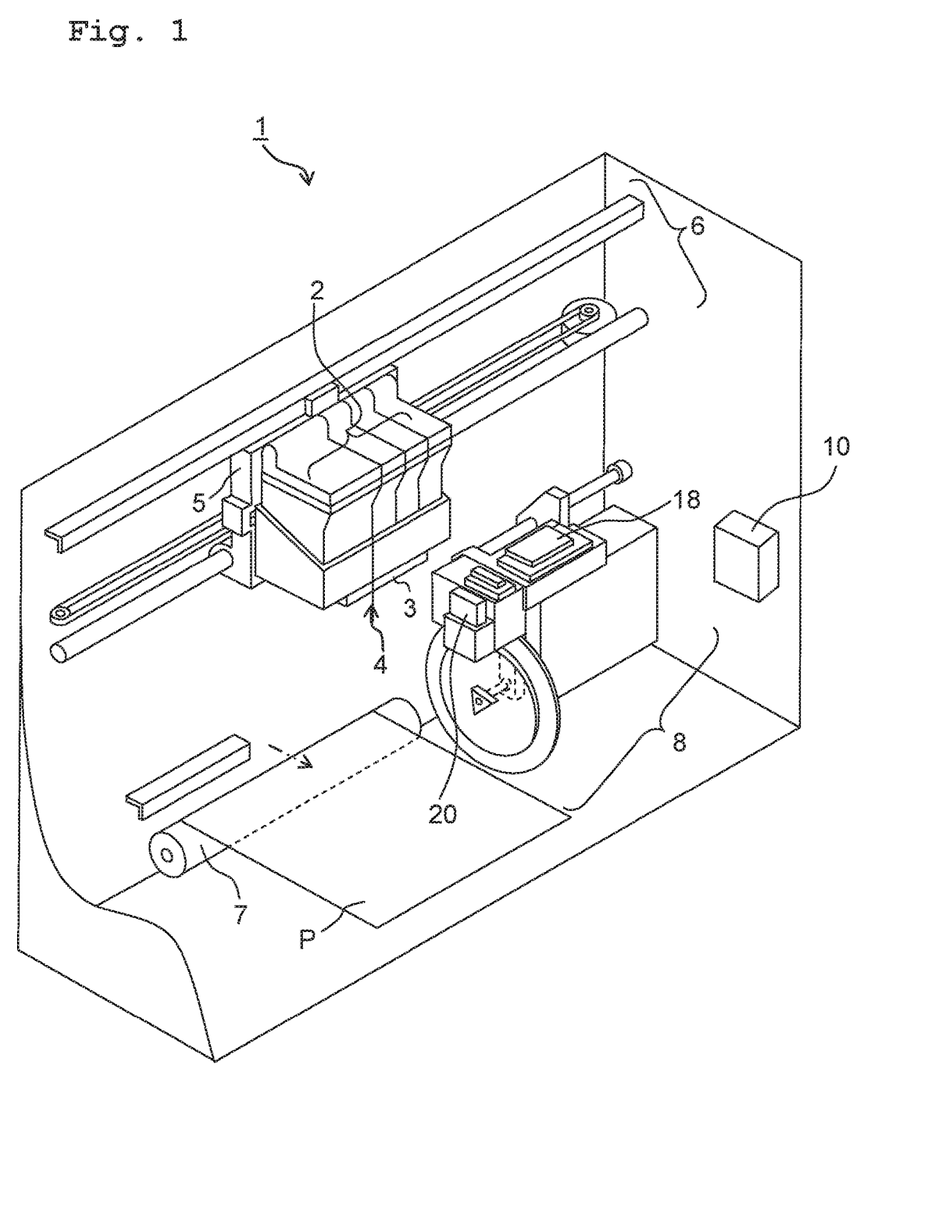
FIG. 1 shows a schematic perspective view illustrating an exemplary structure of an ink-jet recording apparatus of the present teaching.

The FIG. 1 depicts an exemplary configuration of the ink-jet recording apparatus of the present teaching. As depicted in the FIG. 1, an ink-jet recording apparatus 1 of the present teaching includes four ink cartridges (ink containers) 2, an ink jetting mechanism (ink-jet head) 3, a head unit 4, a carriage 5, a driving unit 6, a platen roller 7 and a purge device 8 as main constitutive components or parts. Further, the ink-jet recording apparatus 1 is provided with a controller 10 having CPU, ROM, RAM or the like. The controller 10 controls each unit or part of the ink-jet recording apparatus 1.

Each of the four ink cartridges (ink containers) 2 contains the corresponding one of four water-based inks of yellow, magenta, cyan, and black. For example, at least one of the four water-based inks is the water-based ink for ink-jet recording of the present teaching. Although this example uses a set with the four ink cartridges 2, instead of this, the present teaching may use an integrated type ink cartridge of which interior is comparted to form a water-based yellow ink accommodating section, a water-based magenta ink accommodating section, a water-based cyan ink accommodating section, and a water-based black ink accommodating section. As a body of the ink cartridge, for example, any conventionally known main body (body) of an ink cartridge may be used.

The ink-jet head 3 disposed on the head unit 4 performs recording on a recording medium (for example, recording paper or recording sheet) P. The recording medium may be a recording medium other than the recording paper P, such as cloth (fabric) or the like. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In the FIG. 1, a cap 18 is provided to cover a plurality of nozzles of the ink-jet head 3 which is returned to a reset position upon completion of the recording, so as to prevent the water-based inks from drying.

In the ink-jet recording apparatus 1 of the present embodiment, the four ink cartridges (ink containers) 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, each of the four ink cartridges 2 and the head unit 4 which is provided on the carriage 5 are connected with a tube, etc., and the water-based inks are supplied from the four cartridges 2, respectively, to the head unit 4 via the tubes. Further, in these aspects, it is allowable to use, as ink containers, four ink bottles having a bottle shape, instead of using the four ink cartridges 2. In such a case, each of the ink bottles is preferably provided with an inlet port via which the ink is poured from the outside to the inside of the ink bottle.

Figure 2A:
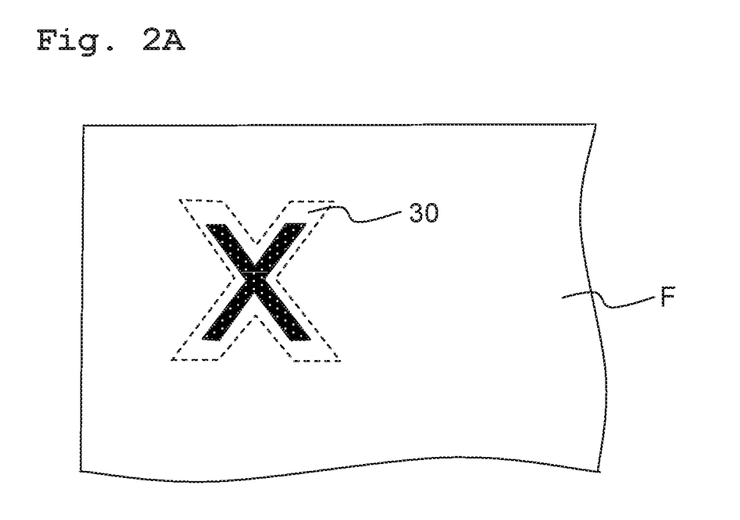
FIGS. 2A and 2B show examples of the recording performed by the recording method of the present teaching.
Figure 2B:
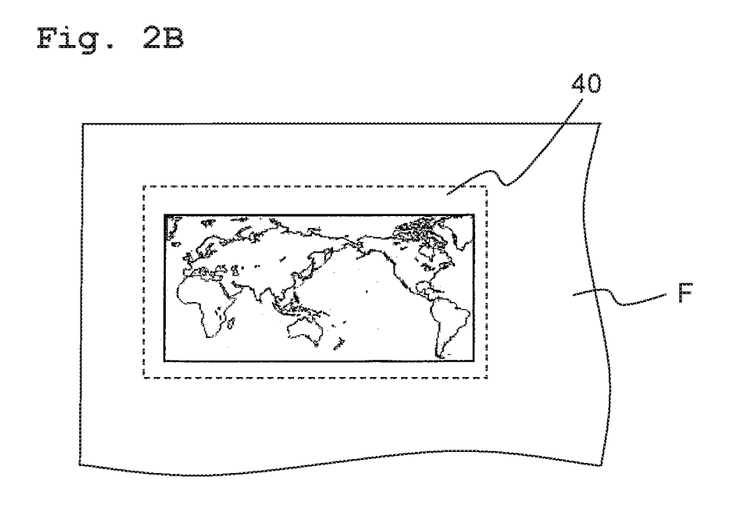
Figure 3:
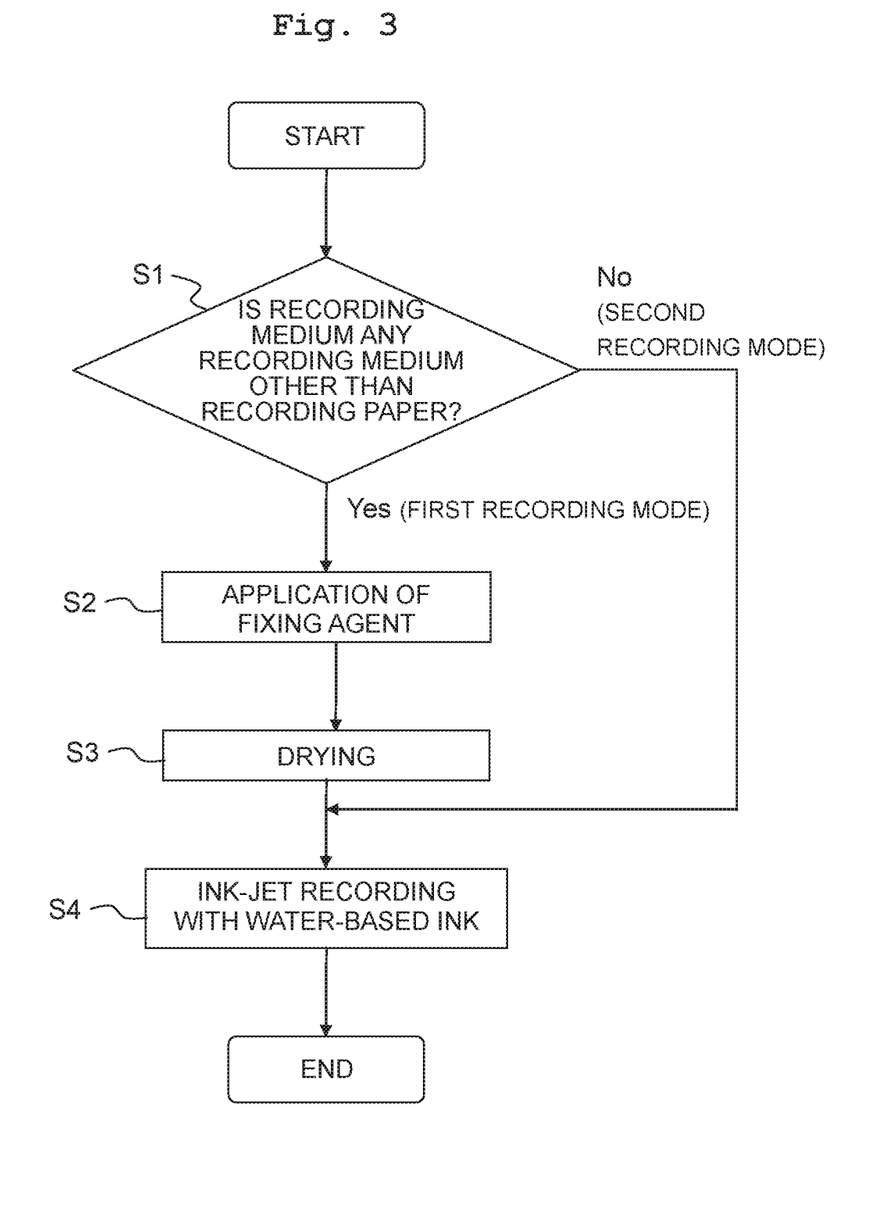
FIG. 3 shows a flow chart illustrating a recording method of the present teaching.

The recording, which is based on the use of the ink-jet recording apparatus 1, is carried out, for example, as follows (see FIG. 3). At first, it is selected whether or not the fixing agent, which constitutes the ink set, is applied depending on the type of the recording medium. If the application is selected, the fixing agent is applied to the recording medium. The selection is performed, for example, by a user. Specifically, the user selects a recording mode which is "recording on recording medium other than recording paper (first recording mode)" or "recording on recording paper (second recording mode)" on a user interface such as a panel or the like provided in the ink-jet recording apparatus 1. The controller 10 may determine whether the first recording mode or the second recording mode is to be executed in accordance with signal inputted from the user interface. The controller 10 may determine whether the first recording mode or the second recording mode is to be executed in accordance with flag corresponding to the recording mode selected on the user interface. Specifically, for example, if the user selects the first recording mode, the flag corresponding to the first recording mode is recorded on a recording area of the controller 10, such as RAM or the like. In a case that the flag corresponding to the first recording mode is recorded, the controller 10 may determine that the first recording mode is to be executed. If the recording medium is the recording medium (for example, cloth or the like) other than the recording paper P (FIG. 3, Step S1: Yes), the fixing agent is applied to the recording medium (FIG. 3, Step S2). In the present teaching, the application of the fixing agent can be carried out, for example, by the spray system, the stamp application, the brush application, the roller application, and the ink-jet system. The fixing agent may be applied either to the entire surface of the recording surface of the recording medium or to a part thereof. If the fixing agent is applied to the part, the application portion is at least the recording portion to be formed by the water-based ink on the recording surface of the recording medium. If the fixing agent is applied to the part, it is appropriate that the size of the application portion is larger than the recording portion. For example, as shown in FIG. 2A, when a letter (X) is recorded on a recording medium F, it is preferable that the fixing agent is applied so that an application portion 30 is formed with a line width which is larger than a line width of the letter. Further, as shown in FIG. 2B, when a pattern is recorded on the recording medium F, it is preferable that the fixing agent is applied so that an application portion 40, which is larger than the pattern, is formed.

For example, if the recording medium is any recording medium other than the recording paper P, the recording method of the present teaching may further include a drying step of heat-treating and drying the recording medium at a temperature of not more than 210° C. before the discharge of the water-based ink after the step of applying the fixing agent (FIG. 3, Step S3). The lower limit value of the heat treatment temperature in the drying step is not specifically limited, which is, for example, not less than 80° C. When the fixing agent is dried, it is thereby possible to suppress the blurring of the water-based ink discharged onto the recording medium in the step to be performed thereafter (FIG. 3, Step S4). Further, it is possible to more decrease the color change (color difference) between when the recording is performed on the recording paper P and when the recording is performed on the cloth. It is estimated that this situation is caused by the fact that when the treating agent is dried, it is thereby possible to suppress any excessive penetration or permeation in the depth direction of the recording medium (cloth or the like) of the water-based ink discharged in the step to be performed thereafter (FIG. 3, Step S3).

Subsequently, the water-based ink is discharged from the ink-jet head 3 onto the recording medium (FIG. 3, Step S4). In this procedure, if the recording medium is any recording medium other than the recording paper P, the water-based ink is discharged onto the application portion applied with the fixing agent.

In this embodiment, when the recording medium is any recording medium other than the recording paper P, the fixing agent is used as the pretreatment agent to be applied to the recording medium prior to the discharge of the water-based ink. However, the present teaching is not limited thereto. In the present teaching, the water-based ink may be previously discharged onto the recording medium, and then the fixing agent may be applied. Alternatively, it is also allowable to simultaneously perform the application of the fixing agent to the recording medium and the discharge of the water-based ink.

If the recording medium is the recording paper P (FIG. 3, Step S1: No), the recording step (FIG. 3, Step S4) based on the use of the water-based ink is carried out without performing the step of applying the fixing agent and the drying step described above.

As described above, the recording method of the present teaching includes determining, depending on the type of the recording medium, whether the first recording mode or the second recording mode is to be executed (FIG. 3, Step S1). In the first recording mode, the recording method of the present teaching includes applying the fixing agent to the recording medium (FIG. 3, Step S2) and discharging the water-based ink onto the recording medium by the ink-jet system (FIG. 3, Step S4). In the second recording mode, the recording method of the present teaching includes discharging the water-based ink onto the recording medium by the ink-jet system (FIG. 3, Step S4) without applying the fixing agent to the recording medium.

The recording medium, which has been subjected to the recording as described above, is ejected or discharged from the ink-jet recording apparatus 1. According to the present teaching, even when the recording is performed on the cloth in place of the recording paper P, the color is suppressed from being lost after the washing with water. It is estimated that the effect to suppress the color loss is brought about such that the electric charge of the dye is counteracted to realize the non-aqueous state by the cationic compound contained in the fixing agent and the water resistance is enhanced, because the dye, which is contained in the water-based ink, is generally anionic. Further, according to the present teaching, the color change (color difference) is small between when the recording is performed on the recording paper P and when the recording is performed on the cloth. In general, the degree of permeation in the depth direction of the water-based ink is large in the cloth as compared with the recording paper P. It is estimated that the difference in the degree of permeation in the depth direction of the water-based ink is one of the causes of the color change (color difference) between when the recording is performed on the recording paper P and when the recording is performed on the cloth. In the present teaching, it is estimated that it is possible to suppress the excessive permeation of the water-based ink in the depth direction of the recording medium (cloth or the like) by using the fixing agent together with the water-based ink, and thus it is possible to decrease the color change (color difference) between when the recording is performed on the recording paper P and when the recording is performed on the cloth. However, the mechanisms as described above are merely estimated, and the present teaching is not limited thereto. Note that in FIG. 1, the paper supply mechanism and the paper discharge mechanism for the recording paper P are omitted from the illustration.

The apparatus shown in FIG. 1 adopts the serial type ink-jet head. However, the present teaching is not limited thereto. The ink-jet recording apparatus may be an apparatus which adopts a line type ink-jet head.

[Recording Medium]

Next, the recording medium of the present teaching will be explained.

The recording medium of the present teaching resides in a recording medium having a coating layer formed on a base material, wherein the coating layer includes the cationic compound represented by Formula (1).

In relation to the recording medium of the present teaching, the base material is exemplified, for example, by cloth (fabric) and recording paper. The formation of the coating layer on the base material can be carried out, for example, in the same manner as the method for applying the fixing agent on the recording medium in the recording method of the present teaching described above.

EXAMPLES

Next, Examples of the present teaching will be explained together with Comparative Examples. Note that the present teaching is not limited to and restricted by Examples and Comparative Examples described below.

[Preparation of Water-Based Ink]

Respective components of ink compositions (Table 1) were mixed uniformly or homogeneously. After that, obtained mixtures were filtrated by using a polytetrafluoroethylene (PTFE) type membrane filter (pore size: 0.20 µm) produced by Toyo Roshi Kaisha, Ltd., and thus a water-based yellow ink for ink-jet recording Y, a water-based magenta ink for ink-jet recording M, and water-based cyan inks for ink-jet recording C1, C2 were obtained.

Table 1 (Following)—Legend

*1: Produced by Nissin Chemical Industry Co., Ltd.; numerical values in Table 1 represent active ingredient amounts

*2: Produced by Lion Corporation; active ingredient: 28% by weight; numerical values in Table 1 represent active ingredient amounts Examples 1 to 12 and Comparative Examples 1 to 5

The water-based yellow ink Y, the water-based magenta ink M, and the water-based cyan ink C1 or C2 shown in Table 1 were combined with the seventeen types of fixing agents shown in Table 2, and thus ink sets of Examples 1 to 12 and Comparative Examples 1 to 5 were obtained.

(a) The image quality evaluation (color difference between recording paper and cotton) and (b) the fixing performance evaluation (color difference before and after washing with water for cotton) were carried out by the following methods with the ink sets of Examples 1 to 12 and Comparative Examples 1 to 5.

(a) Image Quality Evaluation (Color Difference Between Recording Paper and Cotton)

<Measurement of Color for Evaluation Sample of Recording Paper>

Evaluation samples were prepared by recording single color patches of yellow, magenta, and cyan on sheets of recording paper ("BP60PA" produced by Brother Industries, Ltd.) by using the water-based inks for constructing the ink sets of Examples and Comparative Examples by using an ink-jet printer-equipped digital multifunction machine DCP-J4225N produced by Brother Industries, Ltd. The colors of the respective color patches of the evaluation samples ($L^*_1$, $a^*_1$, and $b^*_1$) were measured by a spectrophotometer Spectrolino produced by Gretag Macbeth (measurement field: 2°; white reference: Abs (absolute white); light source: D50; density reference: ANSI T). The measurement result of the color ($L^*_1$, $a^*_1$, and $b^*_1$) is the average value of those obtained by the measurement performed three times.

<Color Measurement for Evaluation Sample of Cotton>

1 g of the fixing agent for constructing each of the ink sets of Examples and Comparative Examples was uniformly applied onto cotton (sheeting) having a planar size of 15 cm×5 cm by a spray system. After the application of the fixing agent, the cotton was ironed for 2 minutes at a high temperature (180° C. to 210° C.) having an upper limit of 210° C., and the cotton was dried. Subsequently, a single color patch of yellow, magenta, or cyan was recorded on the cotton and an evaluation sample was prepared in the same manner as in the recording paper by using the ink-jet printer-equipped digital multifunction machine DCP-J4225N. The color ($L^*_2$, $a^*_2$, and $b^*_2$) of each of the color patches of the cotton evaluation samples was measured in the same manner as the evaluation sample of the recording paper.

TABLE 1

| | | | Y | M | C1 | C2 |
|---|---|---|---|---|---|---|
| Ink composition (% by weight) | Dye | C.I. Direct Yellow 86 | 4 | — | — | — |
| | | C.I. Direct Red 83 | — | 4 | — | — |
| | | C.I. Direct Blue 199 | — | — | 4 | — |
| | | C.I. Acid Blue 90 | — | — | — | 4 |
| | Humectant | Glycerol | 20 | 20 | 20 | 20 |
| | Penetrant | Triethylene glycol n-butyl ether | 2 | 2 | 2 | 2 |
| | Surfactant | Olfine (trade name) E1010 (*1) | 0.2 | 0.2 | 0.2 | 0.2 |
| | | Sunnol (trade name) NL1430 (*2) | 0.2 | 0.2 | 0.2 | 0.2 |
| | Water | | balance | balance | balance | balance |

[Preparation of Fixing Agent]

Respective components of fixing agent compositions (Table 2) were mixed uniformly or homogeneously to obtain seventeen types of fixing agents.

<Calculation of Color Difference ($\Delta E_1$)>

The color difference ($\Delta E_1$) between the color of the evaluation sample of the recording paper and the color of the evaluation sample of the cotton was calculated in accordance with the following expression, and the evaluation was performed in accordance with the following evaluation criteria.

$$\Delta E_1 = \{(L^*_1 - L^*_2)^2 + (a^*_1 - a^*_2)^2 + (b^*_1 - b^*_2)^2\}^{1/2}$$

<Evaluation Criteria for Image Quality Evaluation (Color Difference Between Recording Paper and Cotton)>

A: Color difference ($\Delta E_1$) between recording paper and cotton is not more than 5.0;

B: Color difference ($\Delta E_1$) between recording paper and cotton is above 5.0 and not more than 10.0;

C: Color difference ($\Delta E_1$) between recording paper and cotton is above 10.0.

(b) Evaluation of Fixing Performance (Color Difference Before and after Washing of Cotton with Water The evaluation sample of cotton in (a) the image quality evaluation (color difference between recording paper and cotton) was washed with water for 5 minutes while shaking the sample to such an extent that a part of the evaluation sample was not rubbed with other portions in water. The color ($L^*_3$, $a^*_3$, and $b^*_3$) of each of the color patches of the evaluation samples obtained by performing the drying after the washing with water was measured in the same manner as the evaluation sample of the recording paper in (a) the image quality evaluation (color difference between recording paper and cotton). The color difference ($\Delta E_2$) before and after the washing with water of the evaluation sample of cotton was calculated in accordance with the following expression, and the evaluation was performed in accordance with the following evaluation criteria.

$$\Delta E_2 = \{(L^*_2 - L^*_3)^2 + (a^*_2 - a^*_3)^2 + (b^*_2 - b^*_3)^2\}^{1/2}$$

<Evaluation Criteria for Fixing Performance Evaluation (Color Difference Before and after Washing of Cotton with Water)>

A: Color difference ($\Delta E_2$) before and after washing with water is not more than 5.0;

B: Color difference ($\Delta E_2$) before and after washing with water is above 5.0 and not more than 10.0;

C: Color difference ($\Delta E_2$) before and after washing with water is above 10.0.

Table 2 shows the compositions of the fixing agents and the evaluation results of Examples 1 to 12 and Comparative Examples 1 to 5. Note that "Y" referred to in the column of the evaluation of Table 2 indicates the evaluation obtained for the ink set prepared by the combination with the water-based yellow ink Y shown in Table 1, "M" indicates the evaluation obtained for the ink set prepared by the combination with the water-based magenta ink M shown in Table 1, and "C1" and "C2" indicate the evaluation obtained for the ink set prepared by the combination with the water-based cyan ink C1 or C2 shown in Table 1.

Table 2 (Following)—Legend

*3: lauryl trimethyl ammonium chloride, produced by Dai-ichi Kogyo Seiyaku Co., Ltd.

*4: cetyltrimethylammonium chloride, produced by Dai-ichi Kogyo Seiyaku Co., Ltd.

*5: benzyldimethylalkylammonium chloride represented by the following chemical formula, produced by Tokyo Kasei Kogyo Co., Ltd.

(R = $C_8H_{17}$ to $C_{18}H_{37}$)

*6: polyallylamine, produced by Nittobo Medical Co., Ltd., numerical values in table indicate active ingredient amounts

*7: produced by Junsei Chemical Co., Ltd.

*1: produced by Nissin Chemical Industry Co., Ltd., numerical values in table indicate active ingredient amounts

TABLE 2

| | | | | Example | | | | | |
|---|---|---|---|---|---|---|---|---|---|
| | | | | 1 | 2 | 3 | 4 | 5 | 6 |
| Composition of fixing agent (% by weight) | Cationic compound | Cationic compound | lauryl trimethyl ammonium sulfate | 0.90 | 1.00 | 10.00 | 10.00 | — | — |
| | | | Catiogen (trade name) TML (*3) | — | — | — | — | 10.00 | — |
| | | represented by Formula (1) | Catiogen (trade name) TMP (*4) | — | — | — | — | — | 10.00 |
| | | | didecyldimethylammonium chloride | — | — | — | — | — | — |
| | | | benzalkonium chloride (*5) | — | — | — | — | — | — |
| | | Cationic polymer | PAA (trade name) - 01 (*6) | — | — | — | — | — | — |
| | | | polyethyleneimine 1200 (*7) | — | — | — | — | — | — |
| | | Cationic amino acid | arginine | — | — | — | — | — | — |
| | | | lysine | — | — | — | — | — | — |
| | | Amine | dicyandiamide | — | — | — | — | — | — |
| | Humectant | | propylene glycol | 4.00 | 4.00 | 4.00 | 4.00 | 4.00 | 4.00 |
| | Penetrant | | triethylene glycol n-butyl ether | 1.00 | 1.00 | 1.00 | — | 1.00 | 1.00 |
| | Surfactant | | Olfine (trade name) E1010 (*1) | — | — | — | 1.00 | — | — |
| | Water | | | balance | balance | balance | balance | balance | balance |
| Evaluation | Image quality (color difference between recording paper and cotton) | | Y ($\Delta E_1$) | A (2.2) | A (3.3) | A (3.9) | A (3.7) | A (4.9) | A (3.4) |
| | | | M ($\Delta E_1$) | B (6.6) | A (3.5) | A (3.1) | A (3.8) | A (2.0) | B (5.2) |
| | | | C1 ($\Delta E_1$) | B (6.2) | B (6.8) | A (4.8) | A (4.6) | B (7.5) | B (8.3) |
| | | | C2 ($\Delta E_1$) | — | — | A (5.0) | — | — | — |
| | Fixing performance (color difference before and after washing of cotton with water) | | Y ($\Delta E_2$) | B (6.3) | A (2.4) | A (2.2) | A (3.2) | A (3.8) | A (5.0) |
| | | | M ($\Delta E_2$) | B (8.2) | A (4.1) | A (5.0) | A (4.7) | B (6.5) | B (9.1) |
| | | | C1 ($\Delta E_2$) | B (9.4) | B (7.3) | A (2.4) | A (2.1) | A (1.5) | A (2.2) |
| | | | C2 ($\Delta E_2$) | — | — | A (4.2) | — | — | — |

TABLE 2-continued

| | | | | Example | | | | | |
|---|---|---|---|---|---|---|---|---|---|
| | | | | 7 | 8 | 9 | 10 | 11 | 12 |
| Composition of fixing agent (% by weight) | Cationic compound | Cationic compound represented by Formula (1) | lauryl trimethyl ammonium sulfate | — | — | 10.00 | 10.00 | 10.00 | 10.00 |
| | | | Catiogen (trade name) TML (*3) | — | — | — | — | — | — |
| | | | Catiogen (trade name) TMP (*4) | — | — | — | — | — | — |
| | | | didecyldimethylammonium chloride | 10.00 | — | — | — | — | — |
| | | | benzalkonium chloride (*5) | — | 10.00 | — | — | — | — |
| | | Cationic polymer | PAA (trade name) - 01 (*6) | — | — | — | — | — | — |
| | | | polyethyleneimine 1200 (*7) | — | — | — | — | — | — |
| | | Cationic amino acid | arginine | — | — | — | — | — | — |
| | | | lysine | — | — | — | — | — | — |
| | | Amine | dicyandiamide | — | — | — | — | — | — |
| | Humectant | | propylene glycol | 4.00 | 4.00 | 4.00 | 4.00 | 4.00 | 4.00 |
| | Penetrant | | triethylene glycol n-butyl ether | 1.00 | 1.00 | — | — | — | — |
| | Surfactant | | Olfine (trade name) E1010 (*1) | — | — | 0.10 | 0.20 | 2.00 | 3.00 |
| | Water | | | balance | balance | balance | balance | balance | balance |
| Evaluation | Image quality (color difference between recording paper and cotton) | | Y ($\Delta E_1$) | A (3.6) | A (4.3) | A (2.1) | A (2.6) | A (3.4) | A (2.8) |
| | | | M ($\Delta E_1$) | B (6.8) | B (5.4) | A (3.6) | A (3.3) | A (3.4) | A (3.6) |
| | | | C1 ($\Delta E_1$) | B (7.3) | B (7.2) | A (4.6) | A (4.3) | A (4.1) | A (4.7) |
| | | | C2 ($\Delta E_1$) | — | — | — | — | — | — |
| | Fixing performance (color difference before and after washing of cotton with water) | | Y ($\Delta E_2$) | A (4.3) | A (4.8) | A (4.7) | A (2.9) | A (4.5) | B (6.2) |
| | | | M ($\Delta E_2$) | B (8.8) | B (6.4) | B (6.8) | A (4.6) | A (4.8) | B (8.2) |
| | | | C1 ($\Delta E_2$) | A (2.2) | B (6.1) | B (7.4) | A (2.5) | A (4.4) | B (7.6) |
| | | | C2 ($\Delta E_2$) | — | — | — | — | — | — |

| | | | | Comparative Example | | | | |
|---|---|---|---|---|---|---|---|---|
| | | | | 1 | 2 | 3 | 4 | 5 |
| Composition of fixing agent (% by weight) | Cationic compound | Cationic compound represented by Formula (1) | lauryl trimethyl ammonium sulfate | — | — | — | — | — |
| | | | Catiogen (trade name) TML (*3) | — | — | — | — | — |
| | | | Catiogen (trade name) TMP (*4) | — | — | — | — | — |
| | | | didecyldimethylammonium chloride | — | — | — | — | — |
| | | | benzalkonium chloride (*5) | — | — | — | — | — |
| | | Cationic polymer | PAA (trade name) - 01 (*6) | 10.00 | — | — | — | — |
| | | | polyethyleneimine 1200 (*7) | — | 10.00 | — | — | — |
| | | Cationic amino acid | arginine | — | — | 10.00 | — | — |
| | | | lysine | — | — | — | 10.00 | — |
| | | Amine | dicyandiamide | — | — | — | — | 10.00 |
| | Humectant | | propylene glycol | 4.00 | 4.00 | 4.00 | 4.00 | 4.00 |
| | Penetrant | | triethylene glycol n-butyl ether | 1.00 | 1.00 | 1.00 | 1.00 | 1.00 |
| | Surfactant | | Olfine (trade name) E1010 (*1) | — | — | — | — | — |
| | Water | | | balance | balance | balance | balance | balance |
| Evaluation | Image quality (color difference between recording paper and cotton) | | Y ($\Delta E_1$) | C (11.1) | A (4.6) | B (8.3) | B (8.4) | B (6.5) |
| | | | M ($\Delta E_1$) | C (10.1) | B (8.1) | B (9.4) | C (13.4) | B (6.6) |
| | | | C1 ($\Delta E_1$) | C (14.3) | C (10.7) | C (11.2) | C (14.8) | B (8.5) |
| | | | C2 ($\Delta E_1$) | — | — | — | — | — |
| | Fixing performance (color difference before and after washing of cotton with water) | | Y ($\Delta E_2$) | C (15.9) | C (45.2) | C (48.3) | C (48.3) | C (28.7) |
| | | | M ($\Delta E_2$) | B (9.8) | C (11.8) | C (18.7) | C (22.0) | C (15.2) |
| | | | C1 ($\Delta E_2$) | A (3.0) | C (26.0) | C (43.7) | C (43.4) | C (42.4) |
| | | | C2 ($\Delta E_2$) | — | — | — | — | — |

As shown in Table 2, in Examples 1 to 12, the evaluation results were satisfactory in relation to the image quality (color difference between the recording paper and the cotton) and the fixing performance (color difference before and after the washing of the cotton with water). Note that in relation to Example 4 and Examples 9 to 12 in which the conditions were identical except for the blending amount of the surfactant in the fixing agent, the evaluation results of the fixing performance (color difference before and after the washing of the cotton with water) were especially excellent in Examples 4, 10, and 11 in which the blending amount of the surfactant was 0.2% by weight to 2% by weight.

Further, in relation to Examples 1 to 3 in which the conditions were identical except for the blending amount of the cationic compound represented by Formula (1) in the fixing agent, in the case of Examples 2 and 3 in which the blending amount of the cationic compound was not less than 1% by weight, the evaluation results were especially excellent in relation to the image quality and the fixing performance. Further, in relation to Example 3 and Examples 5 to 8 in which the conditions were identical except for the type of the cationic compound represented by Formula (1) in the fixing agent, in the case of Example 3 which was based on the use of the cationic compound having $X^-$ (anion) that was sulfate ion in Formula (1), the evaluation results were especially excellent in relation to the image quality and the fixing performance.

On the other hand, in Comparative Examples 1 to 5 in which any cationic compound other than the cationic compound represented by Formula (1) was used, the evaluation result or results of any one of or both of the image quality (color difference between the recording paper and the cotton) and the fixing performance (color difference before and after the washing of the cotton with water) was/were unsatisfactory.

As described above, the ink set of the present teaching can be utilized for the recording on both of the recording paper and the recording medium other than the recording paper. The way of use of the ink set of the present teaching is not specifically limited. The ink set of the present teaching is widely applicable to various types of the ink-jet recording.

What is claimed is:

1. An ink set comprising:
a water-based ink for ink-jet recording containing water and at least one of a direct dye and an acid dye; and
a fixing agent containing a cationic compound represented by Formula (1):

(1)

wherein in Formula (1):
$R^1$ to $R^4$ are hydrocarbon groups each having 1 to 20 carbon atoms, and are identical with each other or different from each other;
$X^-$ is an anion; and
a ratio (C/D) of a blending amount (C) of the cationic compound in the fixing agent to a blending amount (D) of the at least one of the direct dye and the acid dye in the water-based ink is 0.2 to 2.5.

2. The ink set according to claim 1, wherein in Formula (1):
$R^1$ to $R^3$ are alkyl groups each having 1 to 5 carbon atoms, and are identical with each other or different from each other;
$R^4$ is an alkyl group having 6 to 20 carbon atoms;
each of $R^1$ to $R^4$ is a substituted or unsubstituted alkyl group, and has a straight chain or a branched chain; and
$X^-$ is the anion.

3. The ink set according to claim 1, wherein in Formula (1), $X^-$ is one selected from the group consisting of methylsulfate ion, ethylsulfate ion, sulfate ion, nitrate ion, acetate ion, dicarboxylic acid ion, tricarboxylic acid ion, and hydroxide ion.

4. The ink set according to claim 1, wherein in Formula (1), $X^-$ is sulfate ion.

5. The ink set according to claim 1, wherein in Formula (1), $X^-$ is halide ion.

6. The ink set according to claim 1, wherein a blending amount of the cationic compound in the fixing agent is not less than 1% by weight.

7. The ink set according to claim 1, wherein:
the fixing agent further contains water; and
a blending amount of water in the fixing agent is not less than 80% by weight.

8. The ink set according to claim 1, wherein the fixing agent further contains polyhydric alcohol.

9. The ink set according to claim 1, wherein the fixing agent further contains a penetrant of which a blending amount in the fixing agent is 0.4% by weight to 10% by weight.

10. The ink set according to claim 1, wherein the fixing agent further contains glycol ether.

11. The ink set according to claim 1, wherein the fixing agent further contains:
propylene glycol; and
triethylene glycol n-butyl ether.

12. The ink set according to claim 1, wherein the fixing agent further contains a surfactant.

13. The ink set according to claim 12, wherein a blending amount of the surfactant in the fixing agent is 0.2% by weight to 2% by weight.

14. The ink set according to claim 12, wherein the surfactant is a nonionic surfactant.

15. The ink set according to claim 1, wherein the fixing agent further contains:
propylene glycol; and an acetylene glycol-based nonionic surfactant represented by Formula (2):

(2)

wherein in Formula (2):
$R^{11}$ to $R^{14}$ are alkyl groups each having 1 to 5 carbon atoms, and are identical with each other or different from each other;
m and n are identical with each other or different from each other, and are numbers which fulfill m+n=1 to 15; and
each of $R^{11}$ to $R^{14}$ is a straight chain or a branched chain.

16. A recording method for performing recording on a recording medium by using an ink set comprising a water-based ink for ink-jet recording and a fixing agent, the recording method comprising:
applying the fixing agent to the recording medium in a case that the recording medium is a recording medium other than recording paper; and
discharging the water-based ink onto the recording medium by an ink-jet system, wherein:
the water-based ink contains a dye and water; and
the fixing agent contains a cationic compound represented by Formula (1):

(1)

wherein in Formula (1):
$R^1$ to $R^4$ are hydrocarbon groups each having 1 to 20 carbon atoms, and are identical with each other or different from each other;
$X^-$ is an anion; and
a ratio (C/D) of a blending amount (C) of the cationic compound in the fixing agent to a blending amount (D) of the at least one of the direct dye and the acid dye in the water-based ink is 0.2 to 2.5.

17. The recording method according to claim 16, wherein the recording medium other than the recording paper is fabric.

18. The recording method according to claim 16, wherein:
the recording method comprises the application of the fixing agent to the recording medium and the discharge of the water-based ink onto the recording medium by the ink-jet system which are performed in this order in a case that the recording medium is the recording medium other than the recording paper; and the recording method further comprises heat-treating and drying the recording medium at a temperature of not more than 210° C. before the discharge of the water-based ink after the application of the fixing agent.

19. The recording method according to claim 16, wherein the dye is at least one of a direct dye and an acid dye.

20. A recording method for performing recording on a recording medium by using an ink set comprising a water-based ink for ink-jet recording and a fixing agent, the recording method comprising:
applying the fixing agent to the recording medium in a case that the recording medium is a recording medium other than recording paper;
discharging the water-based ink onto the recording medium by an ink-jet system; and
determining whether a first recording mode or a second recording mode is to be executed;
in the first recording mode, the recording medium is the recording medium other than the recording paper, and the recording method comprises applying the fixing agent to the recording medium and discharging the water-based ink onto the recording medium by the ink-jet system; and
in the second recording mode, the recording medium is the recording paper, and the recording method comprises discharging the water-based ink onto the recording medium by the ink-jet system without applying the fixing agent to the recording medium; wherein:
the water-based ink contains a dye and water; and
the fixing agent contains a cationic compound represented by Formula (1):

wherein in Formula (1):
$R^1$ to $R^4$ are hydrocarbon groups each having 1 to 20 carbon atoms, and are identical with each other or different from each other; and
$X^-$ is an anion.

* * * * *